United States Patent
Li et al.

(10) Patent No.: US 12,259,511 B2
(45) Date of Patent: Mar. 25, 2025

(54) OFFSHORE APPLICATION OF NON-UNIFORM OPTIMAL SAMPLING SURVEY DESIGN

(71) Applicant: Shearwater GeoServices Software Inc., Houston, TX (US)

(72) Inventors: Zhengxue Li, Houston, TX (US); Yunqing Shen, Houston, TX (US); Jianxing Hu, Houston, TX (US); Yong Ma, Houston, TX (US); Feng Chen, Houston, TX (US); Yu Zhang, Houston, TX (US); Chengbo Li, Houston, TX (US); Charles C. Mosher, Houston, TX (US); Frank D. Janiszewski, Houston, TX (US); Laurence S. Williams, Houston, TX (US); Jeffrey Malloy, Katy, TX (US); Bradley Bankhead, Houston, TX (US); Jon Anderson, Manson, WA (US)

(73) Assignee: Shearwater GeoServices Software Inc., Houston, TX (US)

( * ) Notice: Subject to any disclaimer, the term of this patent is extended or adjusted under 35 U.S.C. 154(b) by 1379 days.

(21) Appl. No.: 16/196,809

(22) Filed: Nov. 20, 2018

(65) Prior Publication Data
US 2019/0293813 A1    Sep. 26, 2019

Related U.S. Application Data

(60) Provisional application No. 62/588,722, filed on Nov. 20, 2017.

(51) Int. Cl.
G01V 1/28 (2006.01)
G01V 1/36 (2006.01)
G01V 1/38 (2006.01)

(52) U.S. Cl.
CPC ............... *G01V 1/282* (2013.01); *G01V 1/36* (2013.01); *G01V 1/38* (2013.01); *G01V 1/3808* (2013.01);
(Continued)

(58) Field of Classification Search
CPC ............... G01V 1/282; G01V 1/3808; G01V 2210/1293; G01V 2210/56; G01V 2210/675
See application file for complete search history.

(56) References Cited

U.S. PATENT DOCUMENTS

| 2,906,363 A | 9/1959 | Clay |
| 3,747,055 A | 7/1973 | Greene |

(Continued)

FOREIGN PATENT DOCUMENTS

| CN | 103954993 | 7/2014 | |
| CN | 104391327 A * | 3/2015 | ............... G01V 1/40 |

(Continued)

OTHER PUBLICATIONS

US 8,737,164 B2, 05/2014, Hillesund et al. (withdrawn)
(Continued)

*Primary Examiner* — Mi'schita' Henson
(74) *Attorney, Agent, or Firm* — Polsinelli PC

(57) ABSTRACT

Method for acquiring seismic data is described. The method includes obtaining undersampled seismic data acquired from a non-uniform sampling grid. Attenuating multiples from the undersampled seismic data.

21 Claims, 15 Drawing Sheets

(52) U.S. Cl.
CPC ........... *G01V 2210/1293* (2013.01); *G01V 2210/1423* (2013.01); *G01V 2210/169* (2013.01); *G01V 2210/56* (2013.01); *G01V 2210/675* (2013.01)

(56) References Cited

U.S. PATENT DOCUMENTS

| | | | |
|---|---|---|---|
| 3,747,056 | A | 7/1973 | Treybig et al. |
| 3,840,845 | A | 10/1974 | Brown |
| 3,877,033 | A | 4/1975 | Unz |
| 4,330,873 | A | 5/1982 | Peterson |
| 4,404,664 | A | 9/1983 | Zachariadis |
| 4,509,151 | A | 4/1985 | Anderson |
| 4,553,221 | A | 11/1985 | Hyatt |
| 4,559,605 | A | 12/1985 | Norsworthy |
| 4,596,005 | A | 6/1986 | Frasier |
| 4,597,066 | A | 6/1986 | Frasier |
| 4,721,180 | A | 1/1988 | Haughland |
| 4,852,004 | A | 7/1989 | Manin |
| 4,958,331 | A | 9/1990 | Wardle |
| 4,967,400 | A | 10/1990 | Woods |
| 4,992,990 | A | 2/1991 | Langeland et al. |
| 5,079,703 | A | 1/1992 | Mosher et al. |
| 5,092,423 | A | 3/1992 | Petermann |
| 5,148,406 | A | 9/1992 | Brink et al. |
| 5,168,472 | A | 12/1992 | Lockwood |
| 5,353,223 | A | 10/1994 | Norton |
| 5,469,404 | A | 11/1995 | Barber et al. |
| 5,487,052 | A | 1/1996 | Cordsen |
| 5,517,463 | A | 5/1996 | Hornbostel |
| 5,724,306 | A | 3/1998 | Barr |
| 5,774,417 | A | 6/1998 | Corrigan et al. |
| 5,787,051 | A | 7/1998 | Goodway |
| 5,835,450 | A | 11/1998 | Russell |
| 5,973,995 | A | 10/1999 | Walker |
| 6,009,042 | A | 12/1999 | Workman et al. |
| 6,493,636 | B1 | 12/2002 | DeKok |
| 6,509,871 | B2 | 1/2003 | Bevington |
| 6,590,831 | B1 | 7/2003 | Bennett et al. |
| 6,691,038 | B2 | 2/2004 | Zajac |
| 6,876,599 | B1 | 4/2005 | Combee |
| 7,167,412 | B2 | 1/2007 | Tenghamn |
| 7,234,407 | B1 | 6/2007 | Levine et al. |
| 7,359,283 | B2 | 4/2008 | Vaage et al. |
| 7,408,836 | B2 | 8/2008 | Muyzert |
| 7,451,717 | B1 | 11/2008 | Levine et al. |
| 7,488,737 | B2 | 3/2009 | Mizuta et al. |
| 7,499,374 | B2 | 3/2009 | Ferber |
| 7,499,737 | B2 | 3/2009 | Mizuta et al. |
| 7,515,505 | B2 | 4/2009 | Krohn et al. |
| 7,545,703 | B2 | 6/2009 | Lunde et al. |
| 7,646,671 | B2 | 1/2010 | Pan |
| 7,993,164 | B2 | 8/2011 | Chatterjee et al. |
| 8,509,027 | B2 | 8/2013 | Strobbia et al. |
| 8,559,270 | B2 | 10/2013 | Abma |
| 8,619,497 | B1 | 12/2013 | Sallas et al. |
| 8,681,581 | B2 | 3/2014 | Moldoveanu et al. |
| 8,711,654 | B2 | 4/2014 | Moldoveanu et al. |
| 8,897,094 | B2 | 11/2014 | Eick et al. |
| 9,110,177 | B1 | 8/2015 | Opfer |
| 9,291,728 | B2 | 3/2016 | Eick et al. |
| 9,529,102 | B2 | 12/2016 | Eick et al. |
| 9,632,193 | B2 | 4/2017 | Li et al. |
| 9,690,003 | B2 | 6/2017 | Sallas |
| 9,823,372 | B2 | 11/2017 | Eick et al. |
| 9,846,248 | B2 | 12/2017 | Eick et al. |
| 10,267,939 | B2 | 4/2019 | Eick et al. |
| 10,514,474 | B2 | 12/2019 | Eick et al. |
| 10,605,941 | B2 | 3/2020 | Li et al. |
| 10,768,325 | B2* | 9/2020 | Allegar ............ G01V 1/3817 |
| 10,809,402 | B2 | 10/2020 | Li et al. |
| 10,823,867 | B2 | 11/2020 | Eick et al. |
| 10,989,826 | B2 | 4/2021 | Eick et al. |
| 11,035,968 | B2 | 6/2021 | Li et al. |

| | | | |
|---|---|---|---|
| 2003/0067842 | A1* | 4/2003 | Sukup ............ G01V 1/3808 702/14 |
| 2004/0172199 | A1 | 9/2004 | Chavarria et al. |
| 2005/0088914 | A1 | 4/2005 | Ren et al. |
| 2006/0164916 | A1 | 7/2006 | Krohn et al. |
| 2006/0268662 | A1 | 11/2006 | Rekdal et al. |
| 2007/0013546 | A1 | 1/2007 | McConnell et al. |
| 2007/0025182 | A1 | 2/2007 | Robertsson |
| 2007/0027656 | A1 | 2/2007 | Baraniuk |
| 2007/0276660 | A1 | 11/2007 | Pinto |
| 2008/0008037 | A1 | 1/2008 | Welker |
| 2008/0049551 | A1 | 2/2008 | Muyzert et al. |
| 2008/0080309 | A1 | 4/2008 | Geokinetics |
| 2008/0089174 | A1 | 4/2008 | Sollner et al. |
| 2008/0144434 | A1 | 6/2008 | Hegna et al. |
| 2008/0151688 | A1 | 6/2008 | Goujon |
| 2008/0205193 | A1 | 8/2008 | Krohn et al. |
| 2008/0225642 | A1 | 9/2008 | Moore |
| 2008/0285380 | A1 | 11/2008 | Rouquette |
| 2009/0006053 | A1 | 1/2009 | Carazzone et al. |
| 2009/0010101 | A1 | 1/2009 | Lunde |
| 2009/0067285 | A1 | 3/2009 | Robertson |
| 2009/0073805 | A1 | 3/2009 | Tulett et al. |
| 2009/0000200 | A1 | 4/2009 | Teigen |
| 2009/0122641 | A1 | 5/2009 | Hillesund |
| 2009/0141587 | A1 | 6/2009 | Welker et al. |
| 2009/0213693 | A1 | 8/2009 | Du et al. |
| 2009/0231956 | A1 | 9/2009 | Schonewille |
| 2009/0251992 | A1 | 10/2009 | Borselen |
| 2009/0262601 | A1 | 10/2009 | Hillesund |
| 2009/0279384 | A1 | 11/2009 | Pavel |
| 2009/0279386 | A1 | 11/2009 | Monk |
| 2009/0323472 | A1 | 12/2009 | Howe |
| 2010/0002536 | A1 | 1/2010 | Brewer |
| 2010/0103772 | A1 | 4/2010 | Eick |
| 2010/0128563 | A1 | 5/2010 | Strobbia et al. |
| 2010/0195434 | A1 | 8/2010 | Menger et al. |
| 2010/0208554 | A1 | 8/2010 | Chiu |
| 2010/0211321 | A1 | 8/2010 | Ozdemir |
| 2010/0265799 | A1 | 10/2010 | Cebver et al. |
| 2010/0299070 | A1 | 11/2010 | Abma |
| 2011/0019502 | A1 | 1/2011 | Eick |
| 2011/0038227 | A1 | 2/2011 | Kostov et al. |
| 2011/0128818 | A1 | 6/2011 | Eick et al. |
| 2011/0156494 | A1 | 6/2011 | Mashinsky |
| 2011/0170796 | A1 | 7/2011 | Qian et al. |
| 2011/0218737 | A1 | 9/2011 | Gulati |
| 2011/0286302 | A1 | 11/2011 | Welker et al. |
| 2011/0305106 | A1 | 12/2011 | Eick et al. |
| 2011/0305107 | A1 | 12/2011 | Eick |
| 2011/0305113 | A1 | 12/2011 | Eick |
| 2011/0307438 | A1 | 12/2011 | Martinez |
| 2011/0317517 | A1 | 12/2011 | Borresen et al. |
| 2012/0002503 | A1 | 1/2012 | Janiszewski et al. |
| 2012/0014212 | A1 | 1/2012 | Eick et al. |
| 2012/0051181 | A1 | 3/2012 | Eick et al. |
| 2012/0082004 | A1 | 4/2012 | Boufounos |
| 2012/0113745 | A1 | 5/2012 | Eick et al. |
| 2012/0143604 | A1 | 6/2012 | Singh |
| 2012/0281499 | A1 | 11/2012 | Eick et al. |
| 2012/0294116 | A1 | 11/2012 | Kamata |
| 2012/0300585 | A1 | 11/2012 | Cao |
| 2013/0135966 | A1 | 5/2013 | Rommel et al. |
| 2013/0250720 | A1 | 9/2013 | Monk et al. |
| 2013/0294194 | A1 | 11/2013 | Pritchard |
| 2014/0119157 | A1* | 5/2014 | Whitmore, Jr. ........ G01V 1/362 367/7 |
| 2014/0133271 | A1 | 5/2014 | Sallas |
| 2014/0146638 | A1 | 5/2014 | Renaud |
| 2014/0211590 | A1 | 7/2014 | Sallas |
| 2014/0278289 | A1 | 9/2014 | Etgen |
| 2014/0303898 | A1 | 10/2014 | Poole |
| 2014/0362663 | A1 | 12/2014 | Jones et al. |
| 2015/0016218 | A1 | 1/2015 | Welker et al. |
| 2015/0078128 | A1 | 3/2015 | Eick et al. |
| 2015/0124560 | A1 | 5/2015 | Li et al. |
| 2015/0272506 | A1 | 10/2015 | Childs |
| 2015/0348568 | A1 | 12/2015 | Li et al. |
| 2016/0018547 | A1 | 1/2016 | Eick |

(56) References Cited

U.S. PATENT DOCUMENTS

| | | | |
|---|---|---|---|
| 2016/0341839 A1 | 11/2016 | Kazinnik et al. | |
| 2017/0031045 A1 | 2/2017 | Poole et al. | |
| 2017/0059724 A1* | 3/2017 | Eick | G01V 1/003 |
| 2017/0082761 A1 | 3/2017 | Li | |
| 2017/0090053 A1 | 3/2017 | Eick | |
| 2017/0108604 A1 | 4/2017 | Turquais et al. | |
| 2017/0168181 A1* | 6/2017 | Zhang | G01V 1/303 |
| 2017/0176614 A1* | 6/2017 | Alhukail | G01V 1/32 |
| 2017/0248721 A1* | 8/2017 | Poole | G01V 1/366 |
| 2018/0067221 A1 | 3/2018 | Eick | |
| 2018/0335536 A1 | 11/2018 | Li | |
| 2019/0129050 A1 | 5/2019 | Li | |
| 2019/0293813 A1 | 9/2019 | Li et al. | |
| 2019/0310387 A1 | 10/2019 | Eick et al. | |
| 2020/0104745 A1 | 4/2020 | Li | |
| 2020/0225377 A1 | 7/2020 | Li et al. | |
| 2021/0033741 A1 | 2/2021 | Li et al. | |

FOREIGN PATENT DOCUMENTS

| | | | |
|---|---|---|---|
| EP | 2103959 | 9/2009 | |
| EP | 2592439 | 5/2013 | |
| EP | 3714294 B1 * | 1/2024 | G01V 1/282 |
| GB | 2550228 A * | 11/2017 | G01V 1/003 |
| WO | 2005019865 | 3/2005 | |
| WO | 2008073178 | 1/2008 | |
| WO | 20090092025 | 7/2009 | |
| WO | 2010149589 | 12/2010 | |
| WO | 2011156491 | 12/2011 | |
| WO | 20110156494 | 12/2011 | |
| WO | 2012166737 | 12/2012 | |
| WO | 2013105075 | 7/2013 | |
| WO | 2014057440 | 4/2014 | |
| WO | WO-2014072387 A2 * | 5/2014 | G01V 1/36 |
| WO | 2015066481 | 5/2015 | |
| WO | 2016009270 | 1/2016 | |
| WO | WO-2016168280 A1 * | 10/2016 | G01V 1/325 |
| WO | 2018085567 | 5/2018 | |

OTHER PUBLICATIONS

Farrow et al., Nyquist-Shannon sampling theorem applied to refinements of the atomic pair distribution function, Oct. 18, 2011, Phys. Rev. B 84, 134105, DOI: 10.1103/PhysRevB.84.134105 (Year: 2011).*

Herrmann et al., "Fighting the curse of dimensionality: compressive sensing in exploration seismology", IEEE Signal Processing Magazine, pp. 1-13 (Year: 2012).*

Buia, M. et al—"Shooting Seismic Surveys in Circles", 2008, Oilfield Review, pp. 18-31; 14 pgs.

Wang, Y., et al—"Recovery of Seismic Wavefields Based on Compressive Sending by an I1-Norm Constrained Trust Region Method and the Piecewise Random Subsampling", 2010, Geophys. J. Int.; 15 pgs.

International Search Report, PCT/US2016/053750 mailed Dec. 27, 2016; 1 pg.

Mosher, Charles C., et al—"Non-uniform optimal sampling for simultaneous source survey design", 2014, SEG Technical Program Expanded Abstracts pp. 105-109, XP055539704.

Mosher, Charles—"Increasing the efficiency of seismic data acquisition via compressive sensing", 2014, The Leading Edge, vol. 33, Issue No. 4, XP055539699; 9 pgs.

Mosher, C.C., et al—"Non-uniform Optimal Sampling for Seismic Survey Design", 2012, 74th EAGE Conference & Exhibition Incorporating SPE Europec 2012, XP055378421.

PCT/US11/39640 PCT International Search Report dated Oct. 26, 2011.

Almendros, "Mapping the Sources of the Seismic Wave field at Kilauea Volcano, Hawaii, Using Data Recorded on Multiple Seismic Antennas", Bulletin of the Seismological Society of America, vol. 92, No. 6, pp. 2333-2351, Aug. 2002, 19 pgs.

Cordsen, et al., "Planning Land 3D Seismic Surveys", Geophysical Developments Series No. 9, Society of Exploration Geophysicists (SEG), Jan. 2000, 16 pgs.

Hennenfent, "Simple Denoise: Wavefield Reconstruction Via Jittered Undersampling", 2008, Geophysics, vol. 73, Issue No. 3, pp. V19-V28; 10 pgs.

Hindriks, et al., "Reconstruction of 3D Seismic Signals Irregularly Sampled Along Two Spatial Coordinates", Geophysics, vol. 65, No. 1 (Jan.-Feb. 2000); pp. 253-263; 11 pgs.

Li, et al—"Marine Towed Streamer Data Reconstruction Based On Compressive Sensing", SEG Houston 2013 Annual Meeting, pp. 3597-3602; 6 pgs.

Li, et al., "Improving Streamer Data Sampling and Resolution Via Non-Uniform Optimal Design and Reconstruction", 2017 SEG International Exposition and 87th Annual Meeting; pp. 4241-4245, 5 pgs.

Li, et al—"Interpolated Compressive Sensing for Seismic Data Reconstruction", SEC Las Vegas 2012 Annual Meeting, 6 pgs.

Li, et al—"A Multi-Stage Inversion Method for Simultaneous Source Deblending of Field Data", 2014, SEG Denver 2014 Annual Meeting, pp. 3610-3615; 6 pgs.

Li, et al—"Aspects of Implementing Marine Blended Source Acquisition in the Field", 2017, SEG International Exposition and 87th Annual Meeting, pp. 42-46; 5 pgs.

Martin, et al—"Acqusition of Marine Point Receiver Seismic Data with a Towed Streamer", SEG 2000 Expanded Abstracts (2000); 4 pgs.

Mosher, "Compressive Seismic Imaging", SEG Las Vegas 2012 Annual Meeting, 2012; 5 pgs.

Musser, et al—"Streamer Positioning and Spread Stabilization for 4D Seismic", SEG/New Orleans 2006 Annual Meeting 6-9 (2006); 4 pgs.

Stolt, "Seismic Data Mapping and Reconstruction", Geophysics, vol. 67, No. 3 (May-Jun. 2002); pp. 890-908; 19 pgs.

Zwartjes, "Fourier Reconstruction of Nonuniformly Sampled, Aliased Seismic Data", Geophysics, vol. 72, No. 1 (Jan.-Feb. 2007); pp. V21-V32; 12 pgs.

Zwartjes, "Fourier Reconstruction of Nonuniformly Sampled, Aliased Data", SEG Int'l Exposition and 74th Annual Meeting, Denver, CO, Oct. 10-15, 2004, 4 pgs.

Milton, Andrew, et al—"Reducing acquisition costs with random sampling and multi-dimentional interpolation", 2011, SEG San Antonio 2011 Annual Meeting, pp. 52-56; 5 pgs.

Liu, Bin, et al—"Minimum weighted norm interpolation of seismic records", 2004, Geophysics, vol. 69, Issue No. 6, pp. 1560-1568; 9 pgs.

Moldoveanu, Nick—"Random sampling: a New Strategy for Marine Acquisition", 2010, SEG Expanded Abstracts, Denver, CO 2010 Annual Meeting, 29, pp. 51-55, 5 pgs.

Mosher, C., et al—"An in-situ analysis of 3-D seismic lateral resolution", 1985, SEG Expanded Abstracts 4, pp. 109-111; 3 pgs.

Sacci, Mauricio D—"A tour of high resolution transforms", 2009, Frontiers & Innovation, CSPG, CSEG, CWLS convention, Calgary, Alberts, Canada, Expanded Abstracts, pp. 665-668; 4 pgs.

Shapiro, Harold, et al—"Alias-free sampling of random noise", 1960, SIAM Journal on Applied Mathematics, vol. 8, Issue No. 2, pp. 225-248; 24 pgs.

International Search Report, PCT/US2017/59760, Mailed Apr. 13, 2018; 2 pgs.

Baraniuk, Richard—"Compressive Sensing", 2007—Rice University Lecture Notes in IEEE Signal Processing Magazine, vol. 24, Jul. 2007, pp. 1-9; 9 pgs.

Kumar, et al—"Source separation for simultaneous towed-streamer marine acquisition—A compressed sensing approach", Geophysics, vol. 80 No. 6, Nov.-Dec. 2015.

Candes, Emmanuel, et al—"Sparsity and Incoherence in Compressive Sampling", 2006, Applied and Computational Mathematics, Caltech, Pasadena, CA 91125 and Electrical and Computer Engineering, Georgia Tech, Atlanta, GA 90332, Nov. 2006; 20 pgs.

Mosher, Charles C—"Generalized Windowed Transforms for Seismic Processing and Imaging", 2012 Annual SEG meeting Las Vegas Nevada Nov 4-9, One Petro, SEG 2012-1196, Published by Society of Exploration Geophysicists; 4 pgs.

(56) References Cited

OTHER PUBLICATIONS

Zhang, Hongchao, et al—"A Nonmonotone Line Search Technique and its Application to Unconstrained Optimization", 2004, Society for Industrial and Applied Mathematics, vol. 14, No. 4, 14 pgs.
Li, et al—"Joint Source Deblending and Reconstruction for Seismic Data", SEG Houston 2013 Annual Meeting, 6 pgs.
Wang, et al—"Distributed Reconstruction Via Alternating Direction Method", in Computational 3, 9, 15 and Mathematical Methods in Medicine, vol. 2013, Article ID 418747, Hindawi Publishing Corporation, 2013, 8 pgs.
Trad, "Interpolation and multiple attenuation with migration operators," Geophysics, 2003, vol. 68(6), pp. 2043-2054; 12 pgs.
Mahdad, et al—"Separation of blended data by iterative estimation and subtraction of blending interference noise," Geophysics, 2011, vol. 76, Issue No. 3, 9 pgs.
Maurer, et al—"Seismic Data Acquisition", Geophysics, 2020, vol. 75, Issue No. 5, 20 pgs.
Hermann, Felix J.—"Randomized sampling and sparsity: Getting more information from fewer samples", 2010, Geophysics, vol. 75, Issue No. 6, p. WB173-WB187; 15 pgs.
Hennenfent, Gilles, et al—Application of stable signal recovery to seismic data interpolation Gilles Hennenfent and Felix J. Herrmann Earth & Ocean Sciences Dept., University of British Columbia 2006; 4 pgs.
Barzilai, Jonathan, et al—"Two-Point Step Size Gradient Methods", 1988, IMA Journal of Numerical Analysis, vol. 8, pp. 141-148, Oxford University Press; 9 pgs.
Lotter, T., et al—"Noise reduction by maximum a posteriori spectral amplitude estimation with supergaussian speech modeling", International Workshop on Acoustic Echo and Noise Control (IWAENC2003), Kyoto, Japan, Sep. 2003, p. 83-86; 4 pgs.
Huang, H., et al—"Joint SRME and model-based water-layer demultiple for ocean bottom node", 2016, Retrieved from internet. URL: https:/www.cgg.com/technicalDocuments/cggv_0000026243.pdf; entire document.
Amir, Vicki, et al—"Structural Evolution of the Northern Bonaparte Basin, Northwest Shelf Australia", 2010, Proceedings, Indonesian Petroleum Association Thirty-Fourth Annual Convention & Exhibition, May 2010; 17 pgs.
Dragoset, Bill, et al—"A perspective on 3D surface-related multiple elimination", Geophysics Society of Exploration Geophysicists U.S. Appl. No. 20/100,901 vol. 75 No. 5.
Ala'i, Riaz, "Shallow water multiple prediction and attenuation, case study on data from the Arabian Gulf", 2002, SEG International Exposition and 72nd Annual Meeting, Salt Lake City, Utah; 4 pgs.
Carlson, David, et al—"Increased resolution and penetration from a towed dual-sensor streamer", 2007, First Break, vol. 25; 7 pgs.
Foster, Douglas J.-et al., "Suppression of multiple reflections using the Radon transform", 1992, Geophysics, vol. 57, No. 3, p. 386-395; 10 pgs.
Jin, Hongzheng, et al—"MWD for shallow water demultiple: a Hibernia case study", 2012, GeoConvention Vision, 5 pgs.
Lin, D., et al—"3D SRME Prediction and Subtraction Practice for Better Imaging", 2005, SEG Houston Annual Meeting; 5 pgs.
Mosher, Charles C., et al—"Compressive Seismic Imaging: Moving from research to production", 2017, SEG International Exposition and 87th Annual Meeting, 5 pgs.
Thomsen, Leon—"Weak elastic anisotropy", 1986, Geophysics, vol. 51, No. 10, Society of Exploration Geophysicists, 13 pgs.
Wang, P., et al—"Model-based Water-layer Demultiple", 2011, SEG San Antonio Annual Meeting; 5 pgs.
*Memorandum Opinion* and *Order—ConocoPhillips Company* v. *In-Depth Compressive Seismic, Inc.*, Civil action H-18-0803; 49 pgs.

* cited by examiner

OFFSHORE APPLICATION OF NON-UNIFORM OPTIMAL SAMPLING SURVEY DESIGN

CROSS-REFERENCE TO RELATED APPLICATIONS

This application is a non-provisional application which claims benefit under 35 USC § 119(e) to U.S. Provisional Application Ser. No. 62/588,722 filed Nov. 20, 2017, entitled "OFFSHORE APPLICATION OF NON-UNIFORM OPTIMAL SAMPLING SURVEY DESIGN," which is incorporated herein in its entirety.

STATEMENT REGARDING FEDERALLY SPONSORED RESEARCH

None.

FIELD OF THE INVENTION

The present invention relates generally to seismic imaging. More particularly, but not by way of limitation, embodiments of the present invention include tools and methods for acquiring and processing undersampled seismic data.

BACKGROUND OF THE INVENTION

Compressive sensing (CS) is an emerging field in signal processing that has applications in many different disciplines including seismic surveying. Traditionally, Nyquist-Shannon sampling theorem established the sufficient condition for a sampling rate that permits a digital signal to capture all the information from a continuous-time signal of finite bandwidth. Compressive sensing provides a new paradigm of sampling which requires far fewer measurements ("undersampled") compared to Nyquist-Shannon sampling criterion. Thus far, compressive sensing theory suggests that successful signal recovery can be best achieved through random measurements together with sparsity of the true signal. However, applying random sampling to seismic surveys raises many concerns and uncertainties.

BRIEF SUMMARY OF THE DISCLOSURE

The present invention relates generally to seismic imaging. More particularly, but not by way of limitation, embodiments of the present invention include tools and methods for acquiring and processing undersampled seismic data.

One method of processing seismic data includes obtaining undersampled seismic data acquired from a non-uniform sampling grid. Attenuating multiples from the undersampled seismic data.

Another method of processing seismic data includes obtaining undersampled seismic data acquired from a non-uniform sampling grid. Attenuating multiples from the undersampled seismic data. Reconstructing the undersample seismic data onto a finer grid.

BRIEF DESCRIPTION OF THE DRAWINGS

A more complete understanding of the present invention and benefits thereof may be acquired by referring to the follow description taken in conjunction with the accompanying drawings in which:

FIG. 1A shows a shot interval distribution from a single gun. FIG. 1B shows cable configuration.

FIG. 2A shows a shot interval distribution. FIG. 2B shows cable configuration.

FIG. 5A shows a distribution of shot intervals. FIG. 5B shows a distribution of shot time intervals.

FIG. 6A shows data acquired with conventional regular design. FIG. 6B shows corresponding deblending result of FIG. 6A. FIG. 6C shows data acquired with a non-uniform optimal sampling shot design. FIG. 6D shows corresponding deblending result of FIG. 6C.

DETAILED DESCRIPTION

Figure 1A:
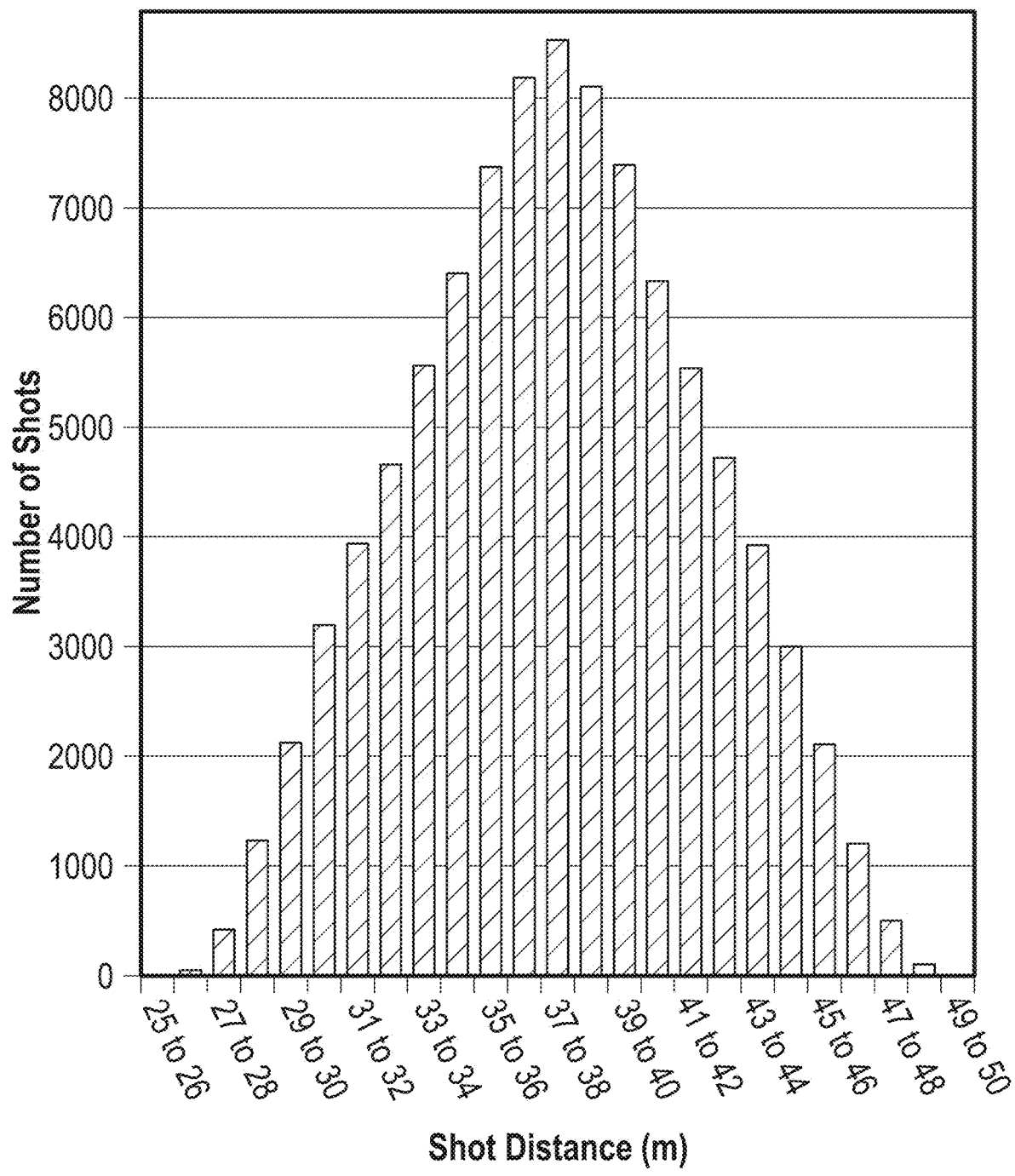
FIGS. 1A-1B illustrate an embodiment of non-uniform optimal sampling design as applied to a marine seismic survey utilizing 12 streamers.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

In signal processing, compressive sensing (CS) asserts that the exact recovery of certain signals can be obtained from far fewer measurements than as required by Shannon's sampling criterion. Generally speaking, applicability of compressive sensing for imaging depends on sparsity of signals and incoherence of sampling waveforms.

The present invention provides systems and methods for acquiring seismic data with relatively few measurements by utilizing compressive sensing principles. These principles include, but are not limited to, non-uniform optimal sampling (NUOS) design, seismic data reconstruction of data acquired using NUOS design, and blended source acquisition with NUOS design. These principles have been applied to real-world seismic survey scenarios including marine and ocean bottom seismic (OBS) and land surveys to increase data bandwidth and resolution.

Non-Uniform Optimal Sampling Design

One of the goals of non-uniform optimal sampling design is to find an optimal sampling grid that favors seismic data reconstruction. Non-uniform optimal sampling design provides a mathematical framework for optimizing both source and receiver configuration designs. As a summary, the following mathematical description of non-uniform optimal sampling design is provided.

The forward model for seismic data reconstruction can be described as $$b=Dx, \quad b=RS^*x, \quad x=Su, \tag{1}$$

where b represents acquired seismic data on an irregular observed grid and u represents reconstructed seismic data on a finer regular reconstructed grid. The operator R is a restriction/sampling operator, which maps data from the reconstructed grid to the observed grid. If S is a suitably chosen dictionary (possibly over-complete), x is a sparse representation of u which has a small cardinality.

Mutual coherence is a measure of incoherency between sparsity basis S and sampling operator R. A high-fidelity data reconstruction requires the mutual coherence to be as small as possible. Assuming D=RS* can be written in a matrix form and $d_i$ represent different columns in D, the mutual coherence μ can be defined as, $$\mu(R, S) = \max_{i \neq j} |d_i^* d_j|, \quad i, j = 1 \ldots n. \tag{2}$$

This is equivalent to the absolute maximum off-diagonal element of the Gram matrix, G=D*D.

The relationship between mutual coherence and successful data reconstruction is appealing for analysis. Typically, for seismic applications, this type of analysis would be prohibitively expensive to compute. However, if S is allowed to be a Fourier transform, then the definition of mutual coherence in equation 2 can be simplified to $$\mu(R) = \max_{l \neq 0} |\hat{r}_l| \tag{3}$$

where $\hat{r}_l$ are Fourier coefficients of diag(R*R). This can be interpreted as finding the largest non-DC Fourier component of a given sampling grid, which can be carried out efficiently using the fast transform. Equation 3 can serve as a proxy for mutual coherence when S is some over-complete dictionary, such as curvelet and generalized windowed Fourier transform (GWT).

Given the estimate for mutual coherence in equation 3, the non-uniform optimal sampling design seeks a sampling grid which minimizes the mutual coherence as follows, $$\min_R \mu(R) = \min_R \max_{l \neq 0} |\hat{r}_l| \tag{4}$$

The optimization problem in equation 4 can be effectively solved by, for example randomized greedy algorithms such as GRASP (Feo and Resende, 1995). In practice, the non-uniform optimal sampling design can be applied to both source and receiver sides.

Seismic Data Reconstruction

Seismic data acquired from the non-uniform optimal sampling design can be reconstructed to a finer grid by solving an analysis-based basis pursuit denoising problem:

$$\min_u \|Su\|_1 \text{ s.t. } \|Ru - b\|_2 \leq \sigma. \tag{5}$$

Here σ is some approximation of noise level in the acquired data b. While conventional interpolation techniques focus on filling in acquisition holes or increasing fold, CS-based data reconstruction improves sampling and extends unaliased bandwidth. Seismic data must be acquired in an irregular fashion in order to employ CS-based data reconstruction. Ideally with a proper non-uniform optimal sampling design, we can increase the unaliased bandwidth by a factor of 2-4 in a certain direction.

Example 1

A production streamer survey is described in this example to illustrate design and reconstruction of marine seismic data in accordance with the present invention. A vessel equipped with a flip-flop source shooting every 18.75 m (on average) was used to acquire 3D streamer survey. Total of 12 streamers were towed behind the vessel. Each streamer was 5 km in length and 600 m in spread width.

Figure 1B:
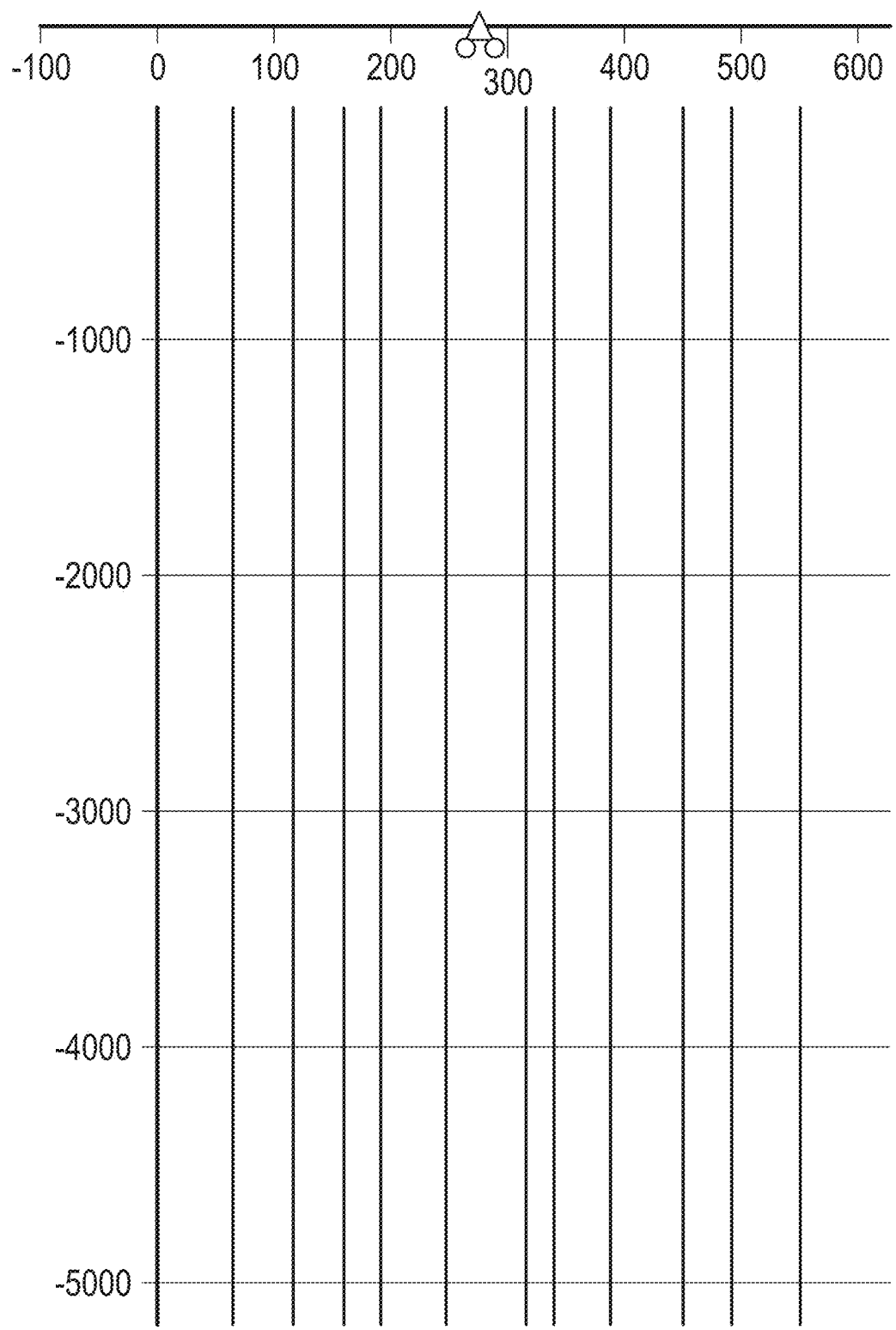
Figure 2A:
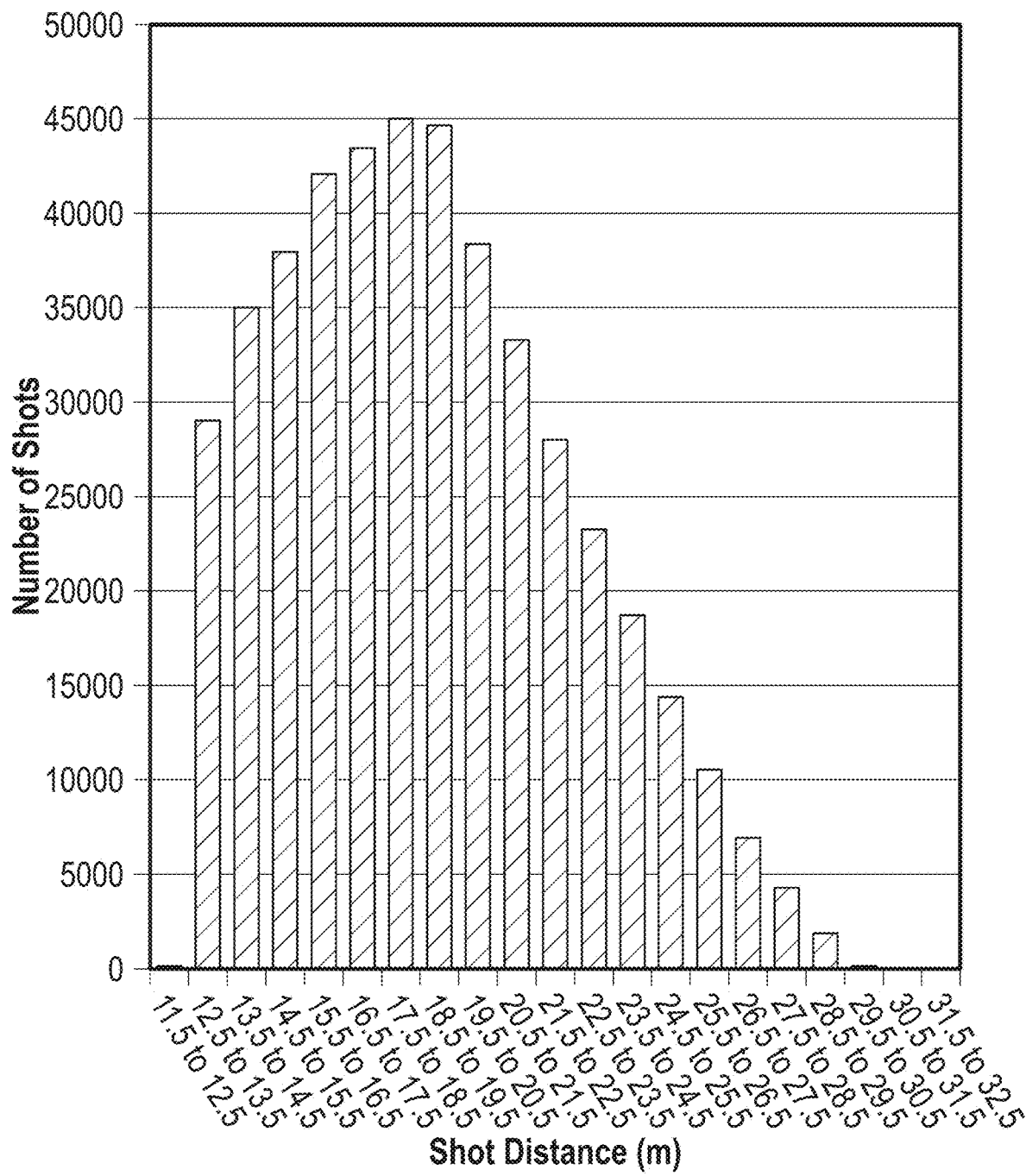
FIGS. 2A-2B illustrate an embodiment of non-uniform optimal sampling design utilizing 16 streamers.
Figure 2B:
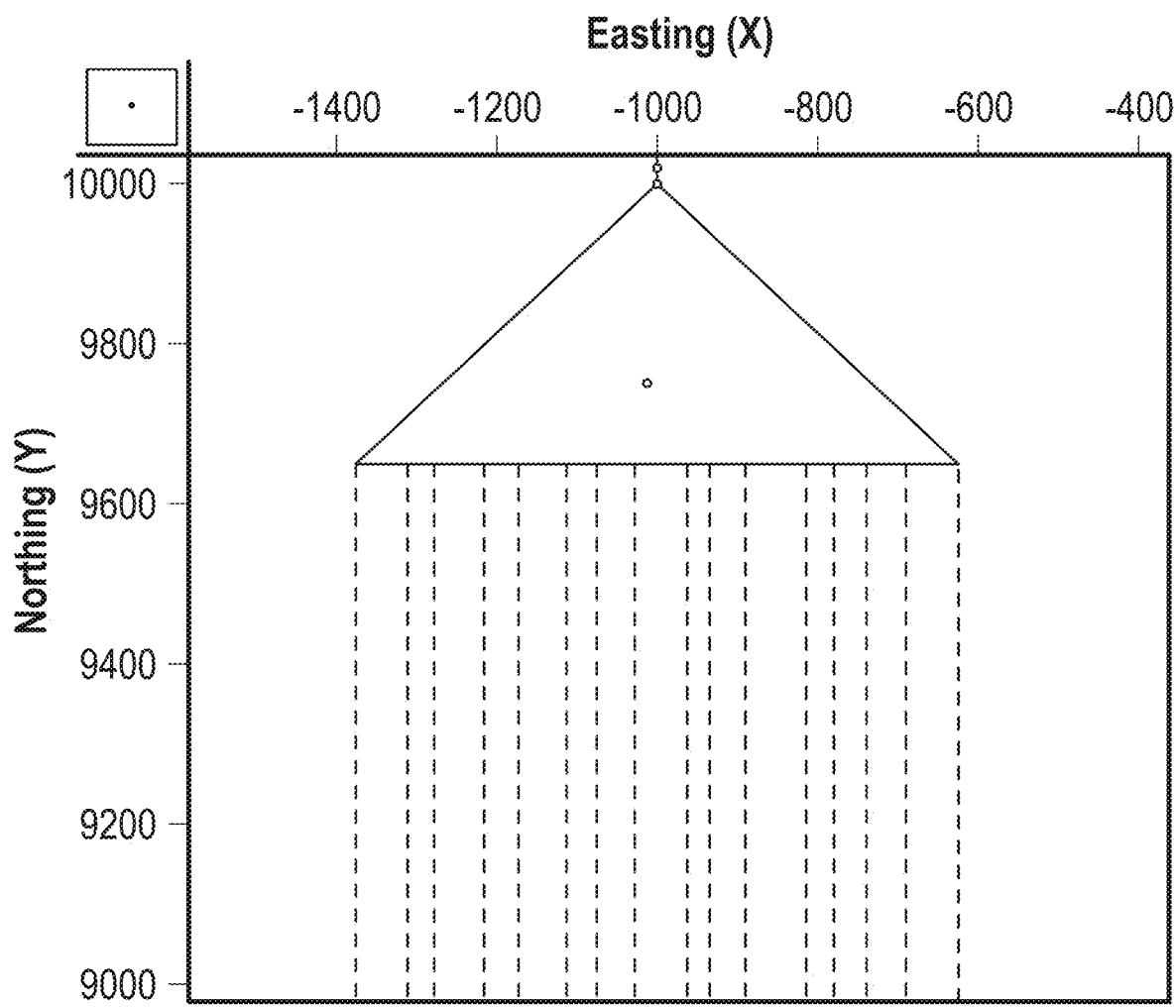

Non-uniform optimal sampling source design was utilized to improve in-line sampling. Non-uniform optimal sampling cable design was utilized to improve cross-line sampling. Design considerations include, but are not limited to, minimum airgun cycle time, minimum cable separation, spread balancing, and the like. FIGS. 1A-1B illustrates non-uniform optimal sampling design principles as applied to a 12 cable configuration. Referring to FIG. 1A, a shot interval distribution from a single gun according to an embodiment is plotted. While FIG. 1A shows shot interval ranging from about 25 m to 50 m, other distance ranges may be consistent with NUOS design depending on a number of factors such as the cable configuration. FIG. 1B shows a cable configuration according to an embodiment. As shown, the cable interval may have non-uniform spacing (ranging from about 25 m to about 200 m). FIGS. 2A-2B illustrate non-uniform optimal sampling design principles as applied to a 16 cable configuration. As shown in FIG. 2A, the shot interval may range from about 10 m to about 31 m. In some embodiments, the shot interval may range from about 5 m to about 100 m. FIG. 2B shows non-uniform spacing of a 16 cable configuration in accordance with an embodiment.

Blended Source Acquisition

In conventional seismic data acquisition, sources are activated with adequate time intervals to ensure no interference between adjacent sources. The acquisition efficiency is limited by equipment and operational constraints. In particular, the source side sampling is often coarse and aliased if long record lengths are needed to obtain energy from far offsets.

In blended source acquisition, multiple sources may be activated within a single conventional shotpoint time window. Overlapping sources in time allows dramatic reduction in time associated with acquisition. It can also improve spatial sampling by increasing shot density. The tradeoff is that sources are blended together and generate so-called "blending noise". The process of separating sources and forming interference-free records is commonly referred to as "deblending."

For marine towed streamer and ocean bottom seismic (OBS), blended source acquisition can be carried out using multiple source vessels shooting simultaneously, or a single source vessel firing at a short time interval. Early marine simultaneous source experiment used an extra source vessel sailing behind the streamer vessel. Two sources were distance-separated and F-K filter was applied to separate shots. Later on, the concept of introducing small random time delays between each pair of sources was developed. Under this time-dithering scheme, interference between two sources became asynchronous incoherent noise and could be suppressed during conventional pre-stack time migration. Recent developments proposed the time-scheduling method for OBS which required little coordination between sources. Each source was assigned a set of random source initiation times and shots were taken following these times.

Both time-dithering and time-scheduling methods required extra manipulation of shot time and sometimes even vessel speed, which further complicates field operation and lead to potential human errors. Blended source acquisition can also be applied to NUOS. The NUOS scheme puts no constraints on shot time and makes minimal operational changes compared to conventional seismic acquisition. Both sampling density and deblending quality can benefit from a joint inversion of data acquired using a NUOS design.

For blended source acquisition, the recording system should be capable of recording continuously. Data should be delivered in a format of continuous records instead of conventional shot gathers. Each continuous record or time segment is expected to contain receives information and record start and end time stamps within at least microsecond precision. The source positioning data together with shot times can be stored in navigation files modified from one of the standard formats (e.g., SPS, P1/90, P1/11, etc). To better assist inversion-based deblending, time stamps from all shots should be recorded including production, non-production and infill shots, also within at least microsecond precision.

Figure 3:
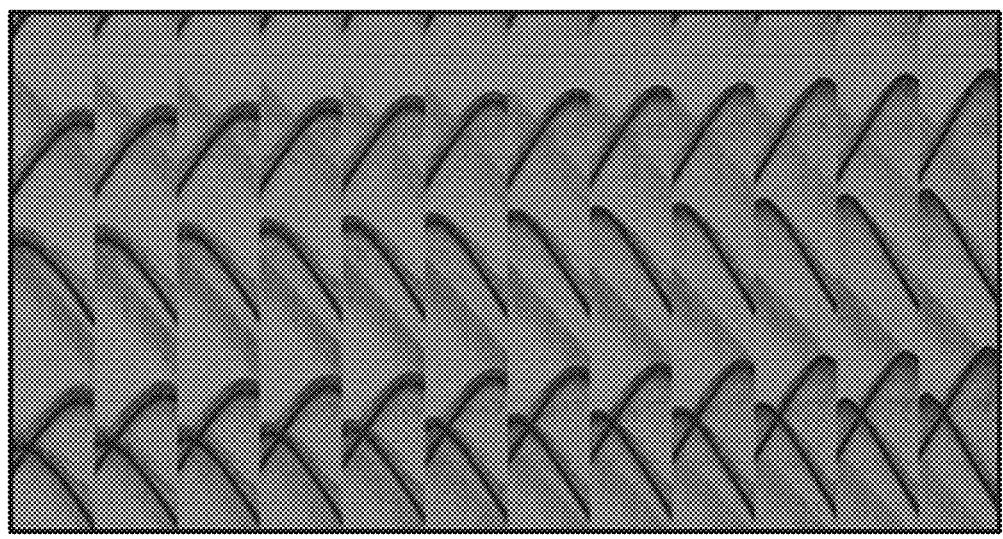
FIG. 3 illustrates an onboard quality control (QC) for continuous records.

Routine onboard QC procedures can still be employed. Continuous records can be examined onboard by displaying the "time-segment gather" (i.e., data within a certain time window sorted by receivers). In this domain, blended shots are observed as coherent energy, regardless of uniform or non-uniform shooting patterns. FIG. 3 illustrates a snapshot of onboard QC, showing a time-segment gather over the entire receiver patch. The opposite-trending moveouts indicate shots that were activated from two distanced sources. This survey employed dual-vessel simultaneous shooting with NUOS design and led to a reduction in overall survey time, including time for receiver deployment, mobilization and demobilization. Onboard processing was kept to a minimum to avoid damaging the integrity of the continuous records.

CS-Based Survey Design Principle

Separating blended sources can be better solved under a CS framework. Forward solutions have been proposed by exploiting the sparsity of seismic data, such as the generalized windowed Fourier. The non-uniform sampling scheme favors the inversion-based deblending by promoting the incoherence of blending noise. For seismic acquisition, a measure of incoherence ("mutual coherence") is used to guide the non-uniform survey design. Referring back to equations 2-4, a proxy of mutual coherence can be effectively computed using the Fourier transform. Non-uniform optimal sampling minimizes mutual coherence to obtain an optimal survey design.

Example 2

Figure 4:
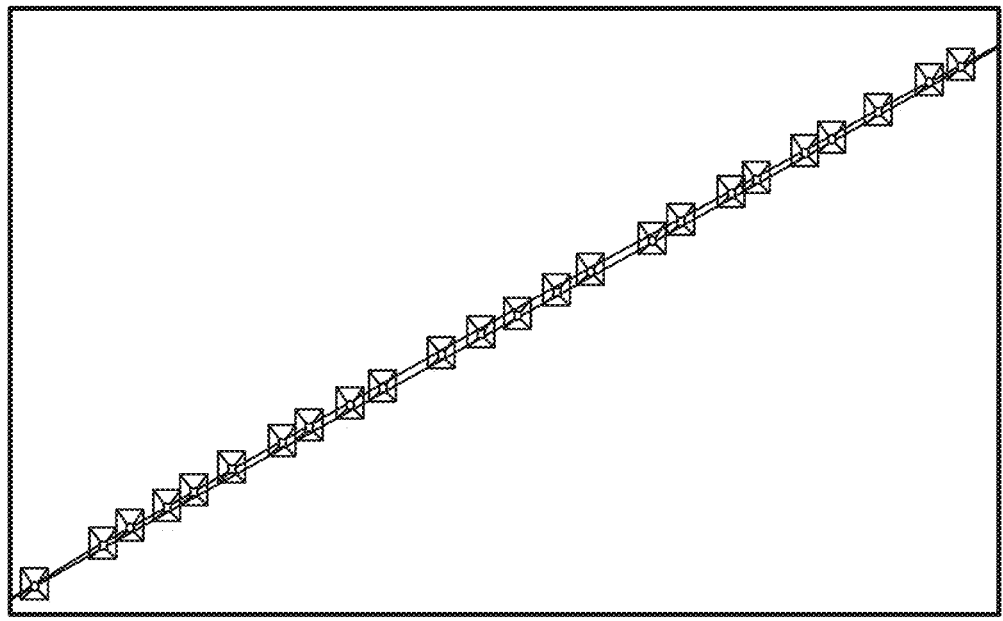
FIG. 4 illustrates implementation of non-uniform optimal sampling shot spacing in the field.

A field trial was conducted in the early stage of development. FIG. 4 illustrates an aspect of the field trial. Each red dot represents a pre-plot shot location derived from the optimization process, and each red box represents a shot point in the field. Through the course of the field trial, 0.5 m inline accuracy was achieved for 99:6% shots. The field trial removed barriers to implementing NUOS design on shots in production surveys.

Figure 5A:
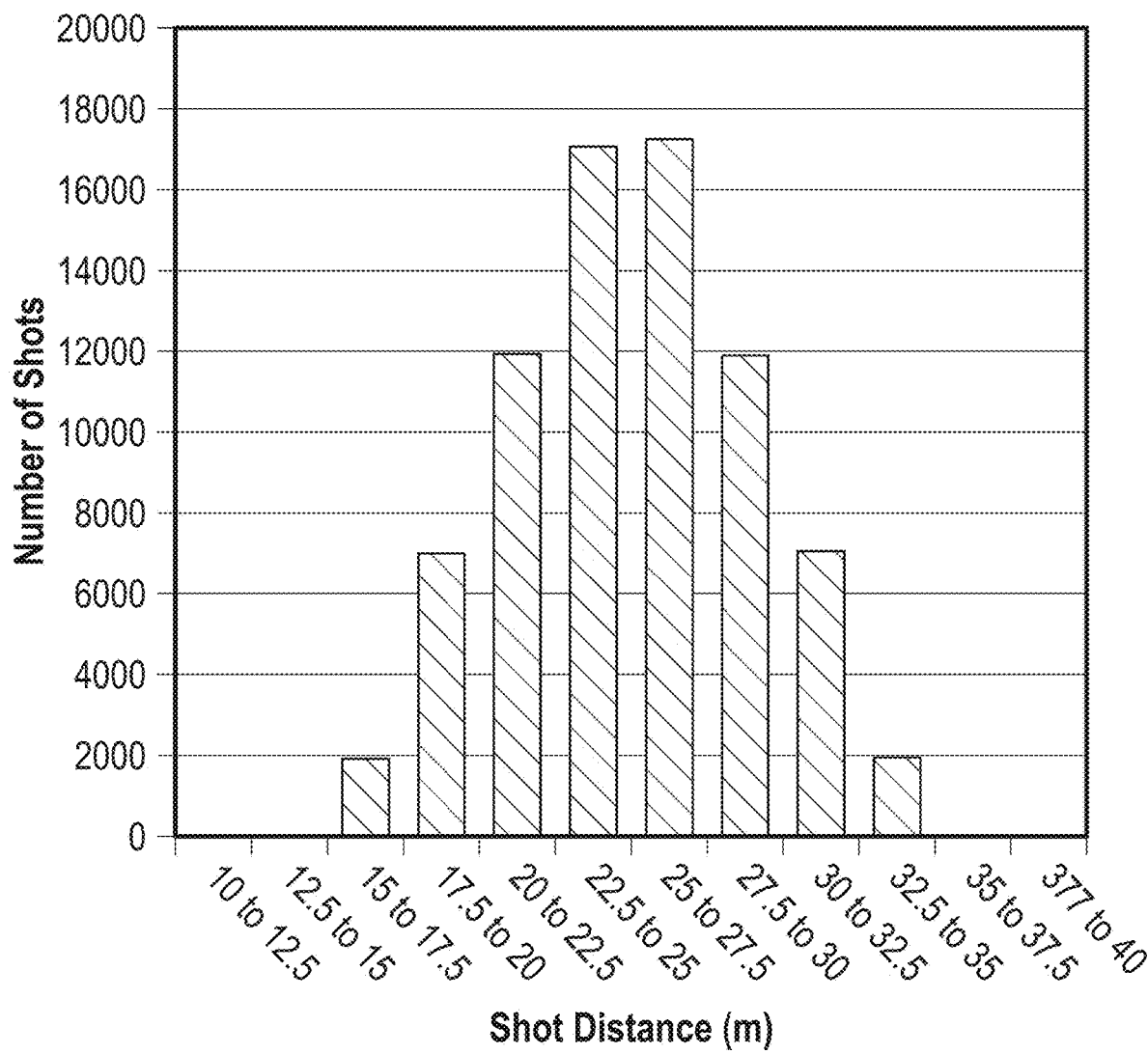
FIGS. 5A-5B illustrate non-uniform optimal sampling shot design statistics from a production survey.
Figure 5B:
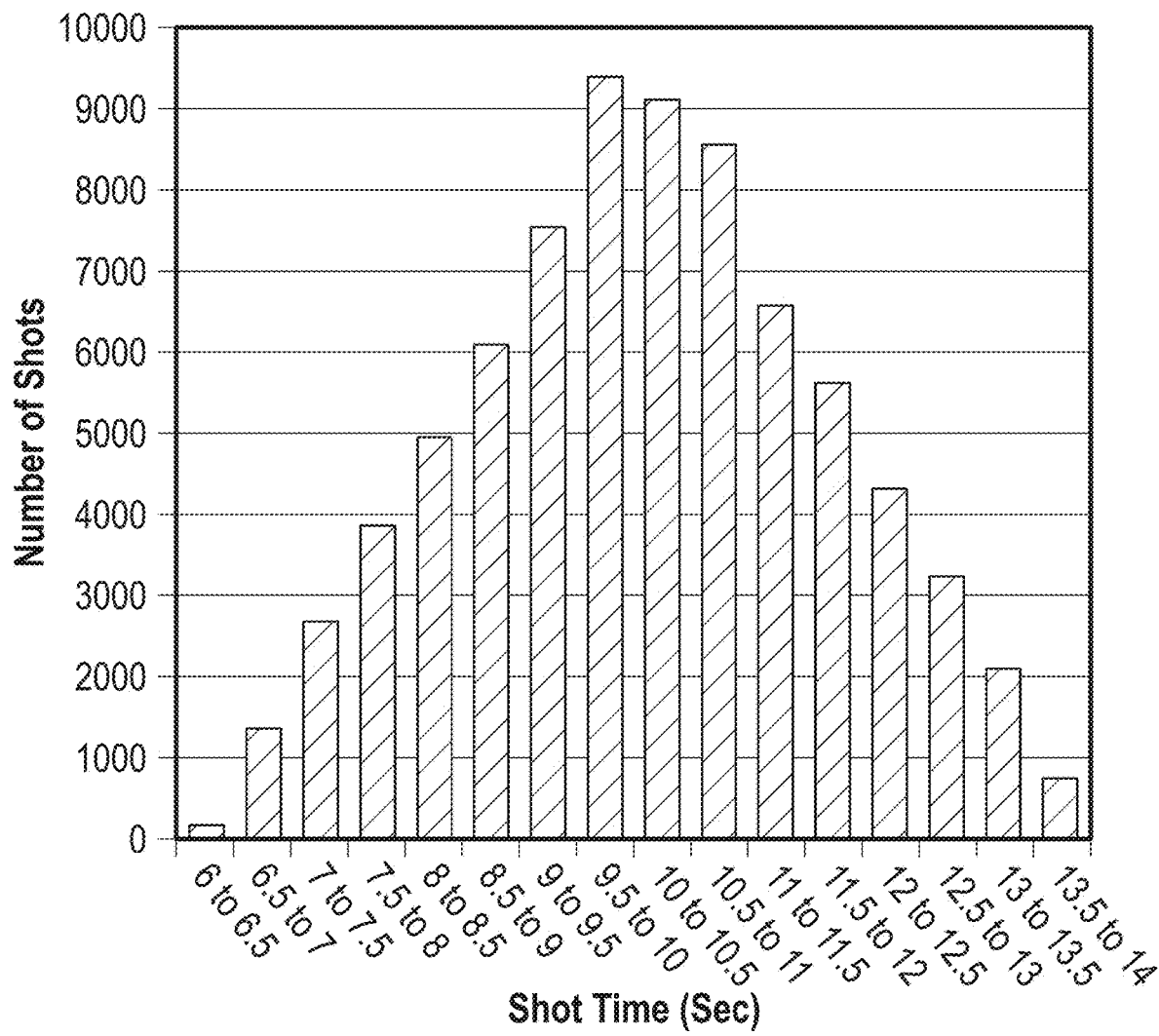

For blended source acquisition, we rely on the non-uniform design in space, which by nature gives rise to irregularity in time, to generate the incoherent blending pattern needed for source separation. FIGS. 5A-5B show statistics from a production survey designed with non-uniform optimal sampling shot spacing. FIG. 5A plots a distribution of shot intervals that ranged from 15 m to 35 m. FIG. 5B plots a distribution of rendered shot time intervals that ranged from 6 s to 14 s.

Figure 6A:
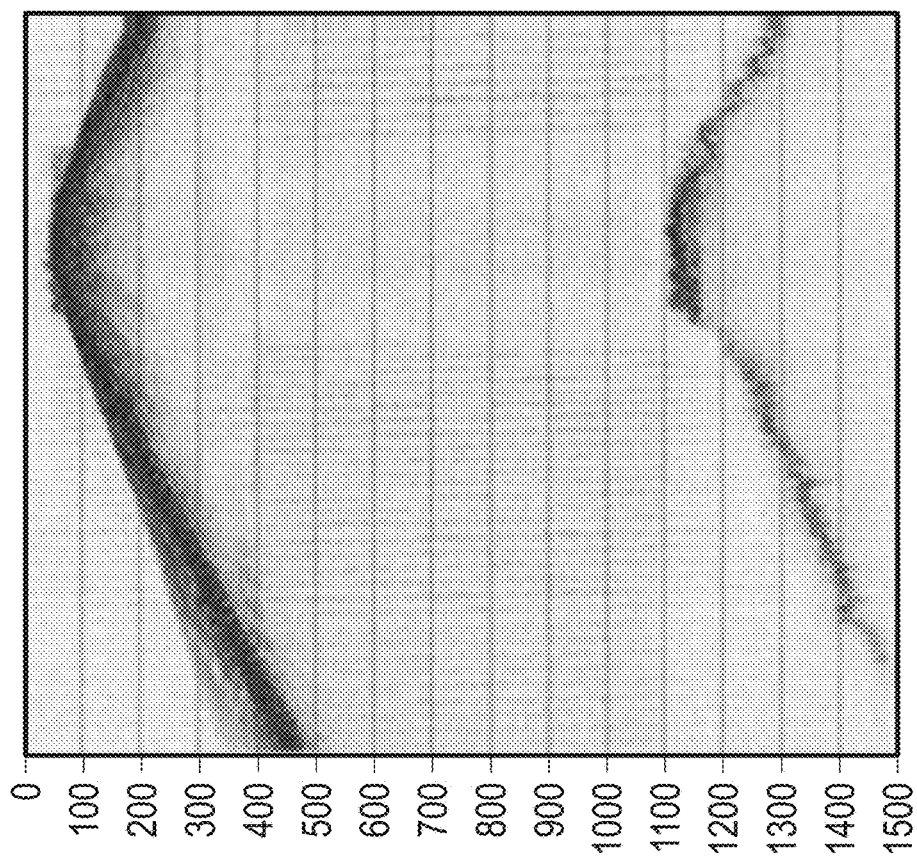
FIGS. 6A-6D illustrate a comparison of a non-uniform optimal sampling shot design to a conventional regular design on deblending quality.
Figure 6B:
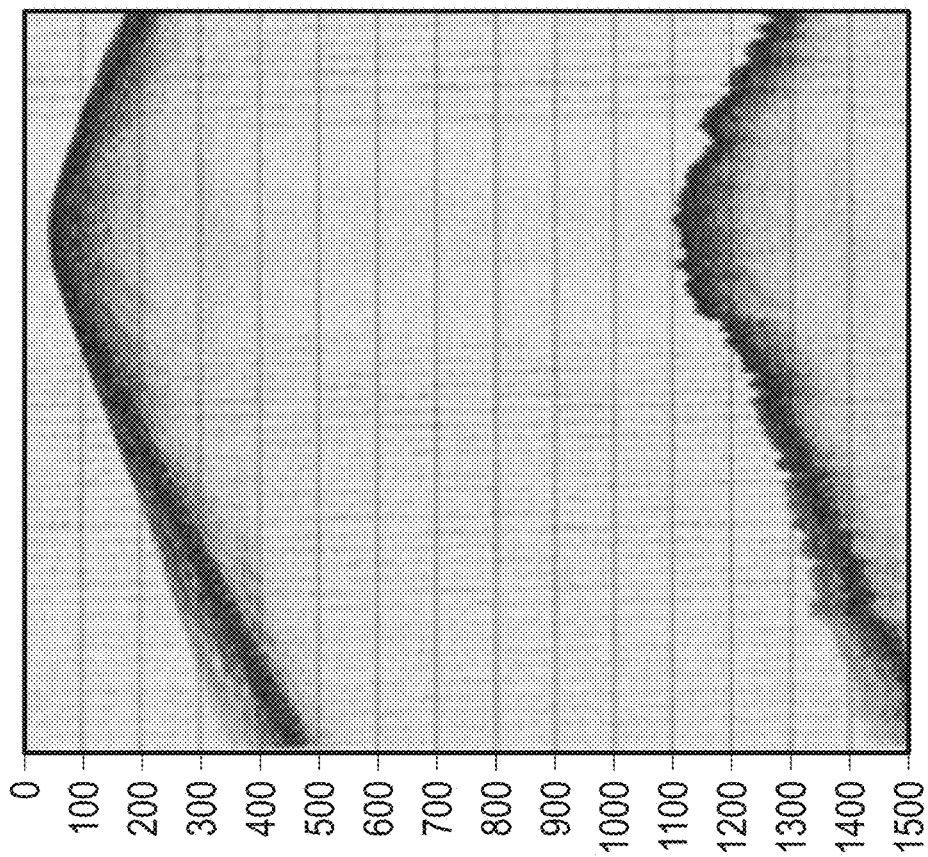
Figure 6D:
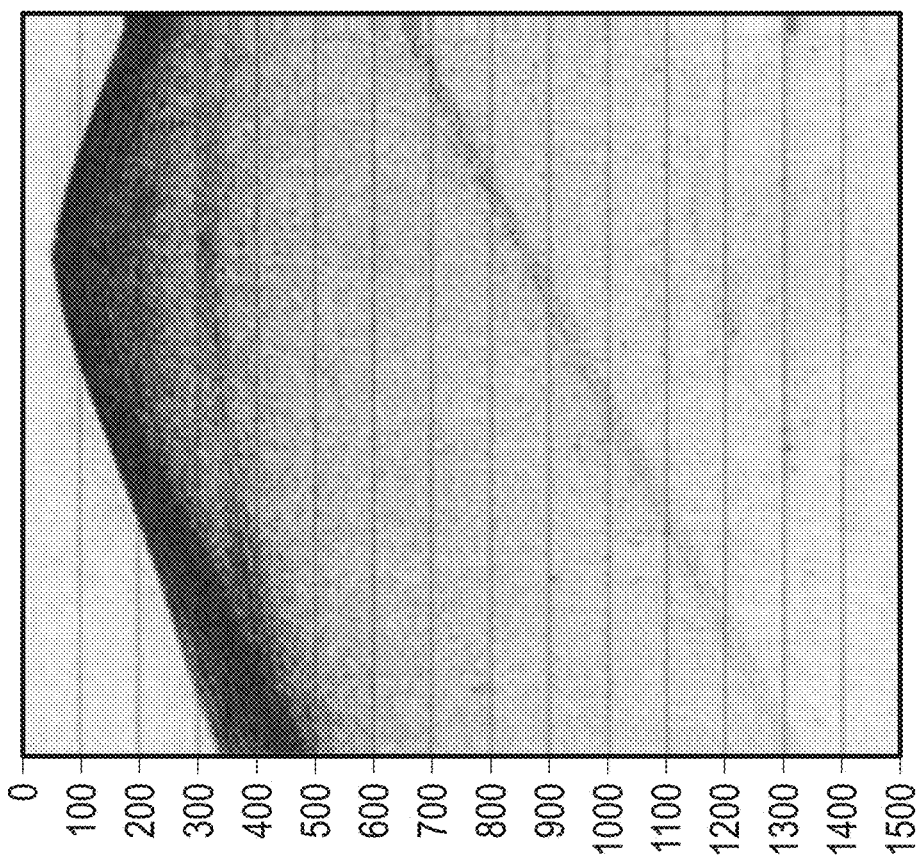
Figure 6C:
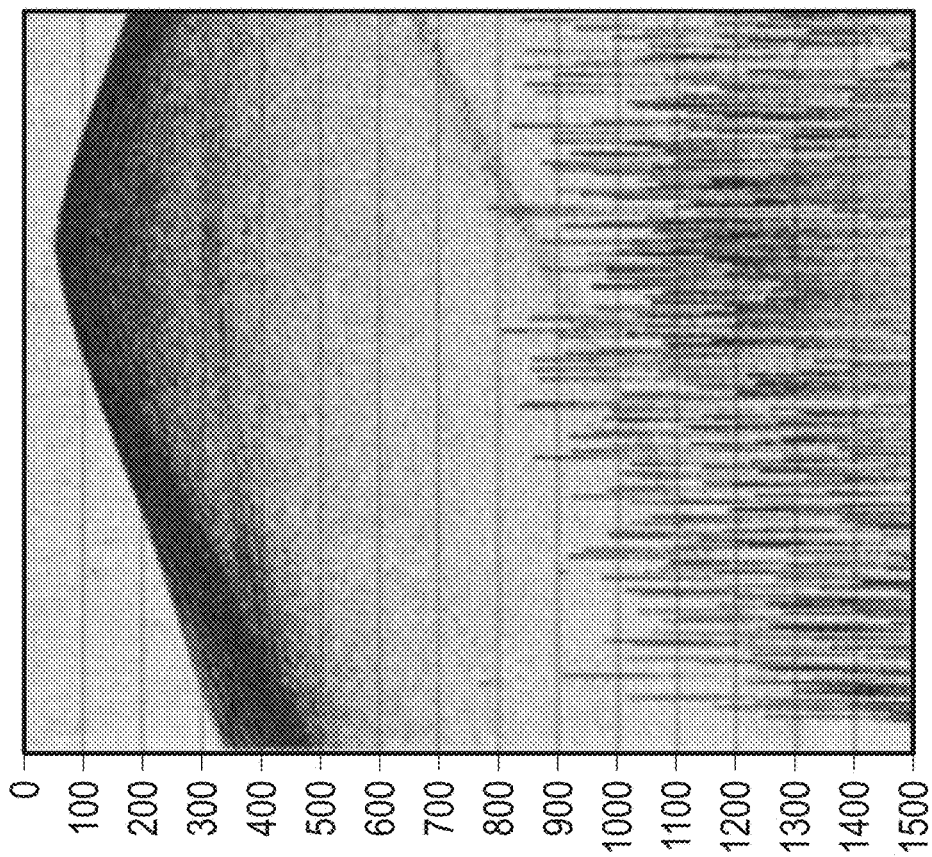

FIGS. 6A-6D compare data acquired with a NUOS design and a conventional regular design, both from the same survey. Fifteen seconds record length was kept to preserve far offsets and converted waves. FIG. 6A shows a receiver gather, as part of a velocity line, with shots spaced at regular 25 m intervals. As shown, self-blending occurred after 10 s. The interference pattern was somewhat incoherent even with a regular shot spacing, thanks to natural variations in vessel speed. FIG. 6C shows the same receiver with production shots optimally spaced at nominal 25 m intervals. The interference from self-blending came in as early as 7.5 s and spread over a longer time interval. The incoherence of blending noise was significantly enhanced by the NUOS design.

The same inversion-based deblending method was applied on both datasets for a fair comparison. The method solves an analysis-based a minimization using the nonmonotone ADM (Li et al., 2013b). FIGS. 6B and 6D show the corresponding deblending results. For data with a regular design, we see a fair amount of blending noise leaked through deblending, due to insufficient incoherence to separate signal from noise. On the other hand, a much improved deblending result was achieved from data with a NUOS design. The blending noise was reduced to a minimum while primaries were intact. This result indicates that the NUOS design was preferable for the inversion-based deblending method. A similar conclusion has been observed from dual-vessel simultaneous shooting.

Example 3

A Pre-Stack Depth Migration (PSDM) imaging project using this data was carried out using data obtained via NUOS. In this Example, the seismic data was acquired offshore using the acquisition design described in FIGS. 1A-1B. The careful execution of seismic data acquisition, processing, imaging and velocity modeling workflows played a vital role in the success of the project. The final imaging quality was superior to the legacy one, featuring better multiple suppression, clearer reservoir structures, sharper fault planes and good seismic-to-well ties.

Figure 7A:
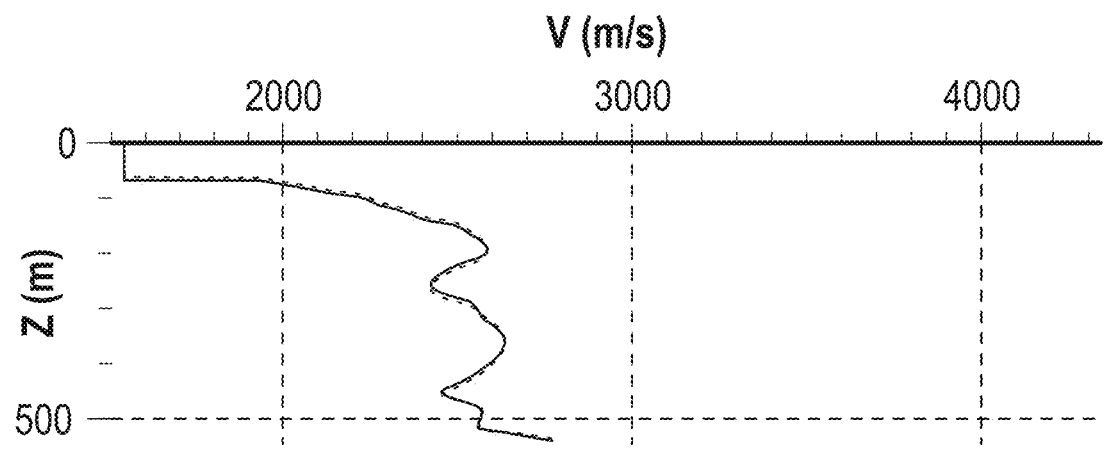
FIGS. 7A-7C show velocity profile around water bottom (FIG. 7A), water bottom imaged using primaries (top) and multiples (bottom) (FIG. 7B), and CSI data 2D stack before and after demultiple (FIG. 7C).

The CSI acquisition and processing effort described below is aimed to assist well planning for new production development of an offshore gas field, where the average water depth is ~80 m and water bottom sediment velocity exceeds 2000 m/s (FIG. 7A). A Pre-Stack Time Migration (PSTM) product from a streamer survey acquired in the late 1990's (referred to as legacy survey) was used for original geophysical interpretation and field development. However, the existing PSTM product is inadequate to de-risk a drilling program mainly in the following aspects: 1) obscure top reservoir image due to severe residual multiple interference as confirmed by poor seismic-to-well data correlation, 2) the uncertainty of the top reservoir structure needs to be further reduced for managing future development cost and 3) both vertical and lateral seismic resolution needs to be significantly improved to support better geophysical interpretation. Based on data quality and acquisition analysis, a re-processing and depth imaging project of the legacy survey would not provide a step change in seismic image quality to address the aforementioned challenges.

Due to the constraints in the legacy data, a CSI acquisition was carried out. The acquisition used a nominal shot interval of 37.5 m and nominal cable spacing of 50 m. The NUOS source and cable distributions support data reconstruction to finer grids (12.5 m shot interval and 25 m cable spacing in theory). Pairing this with commercially available broadband marine acquisition technology (GeoStreamer®) which allows accurate receiver deghosting via P-Z summation led to broader bandwidth and improved signal-to-noise ration. This new acquisition also features a slightly smaller minimum offset (~90 m, comparing to the ~110 m for the legacy survey) which improves near-angle data recording for shallow reflections. These key acquisition specifications are critical to address the challenges discussed in the previous paragraph.

Seismic Data Processing

Multiple attenuation was the number one challenge for this project. Currently, the oil and gas industry has adapted to a data-driven surface related multiple elimination (SRME) methodology, while other methods such as high-resolution Radon (Foster and Mosher, 1992) and predictive deconvolution in the x-t or τ-p domain (Alai et al., 2002) may still play a role in shallow water environment. However, the direct application of data-driven SRME was ineffective in suppressing water column reverberation-related multiples due to the lack of near-angle water bottom reflection data. To overcome this, a Green's function method can be employed to model near-angle water bottom reflection given water velocity and a water bottom model. The modeled data was then convolved with the field data to predict water column reverberation-related multiples. The success of this method (referred to as Green's function SRME) relies heavily on the accuracy of water bottom model (Wang et al., 2011). Due to the same reason (the lack of near-angle data), the image from surface-related multiple migration is a better choice over the one from primary migration (Whitmore et al., 2010). Angle gathers were generated from multiple migration, and only near angles were stacked to avoid post-critical angle contamination.

Figure 7B:
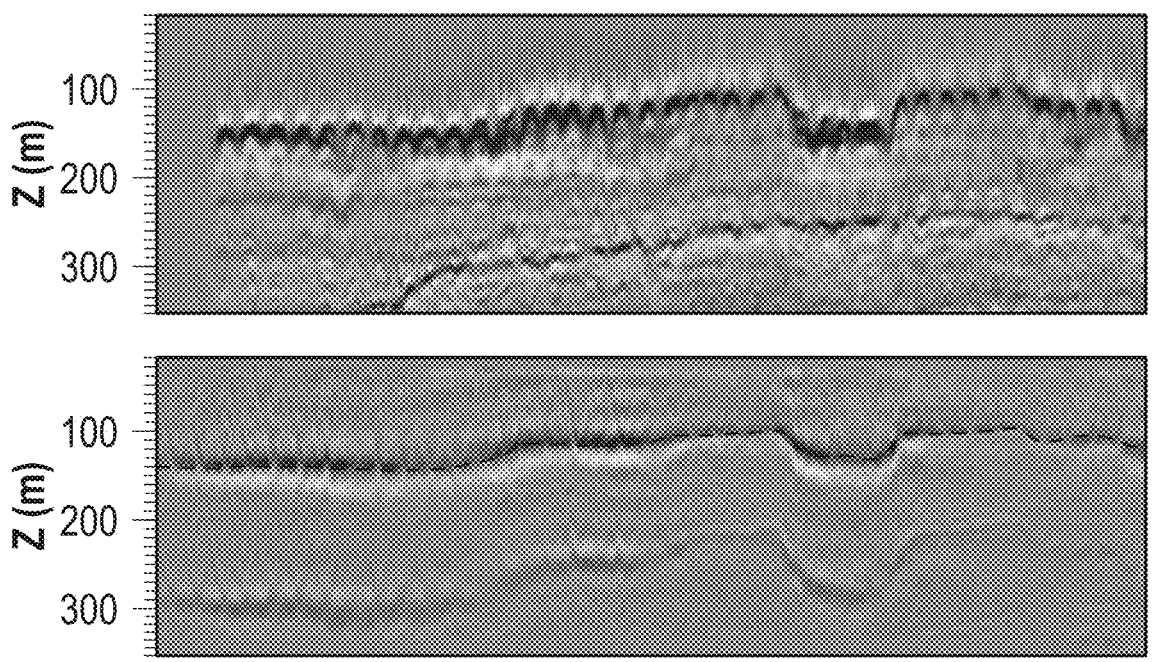
Figure 7C:
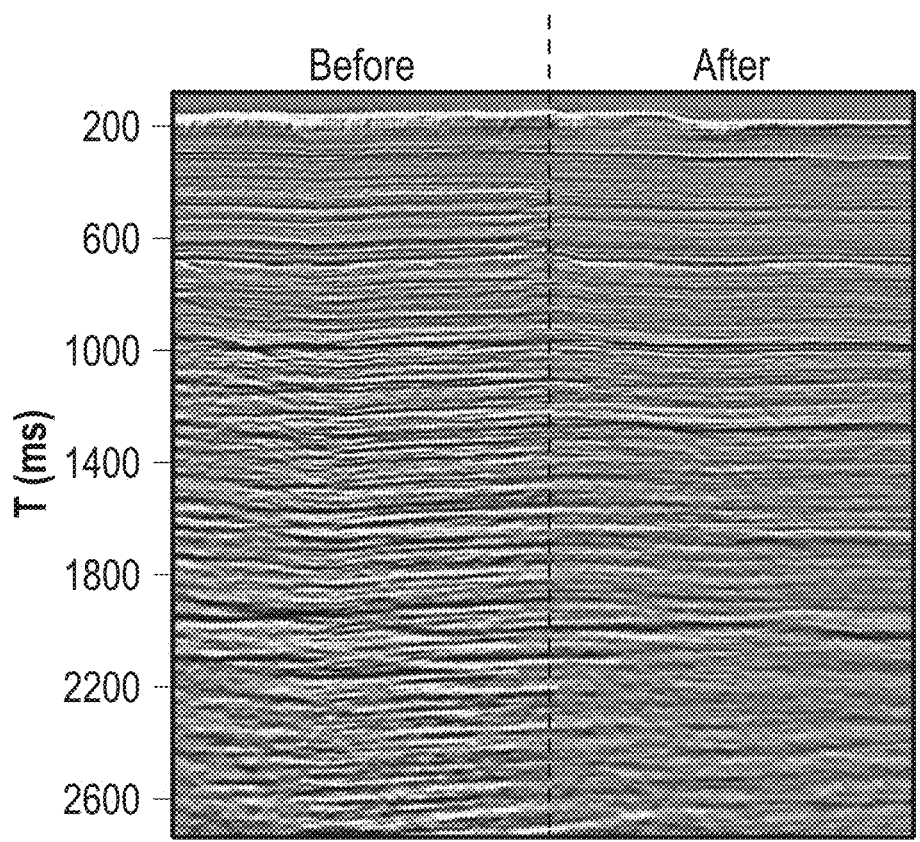

As shown in FIG. 7B, the water bottom image from multiple migration (bottom panel) is of higher resolution and more continuous than the one from primary migration (top panel). The application of the Green's function SRME has successfully predicted a significant portion of all surface-related multiples. The rest of surface-related multiples were further predicted using two additional data-driven SRME methods: shallow-water SRME and conventional SRME. The shallow-water SRME was focused on predicting source and receiver side multiples generated by shallow reflectors, while the conventional SRME was focused on predicting long-period multiples generated from deep reflectors. All three multiple models were adaptively weighted and summed together to form a single multiple model which was in turn subtracted from the input data via least square approach. This multi-method based demultiple flow has led to superior multiple suppression results as indicated by pre-migration stack QC (FIG. 7C) and comparison to legacy results in post-migration domain (FIG. 10B).

Figure 8A:
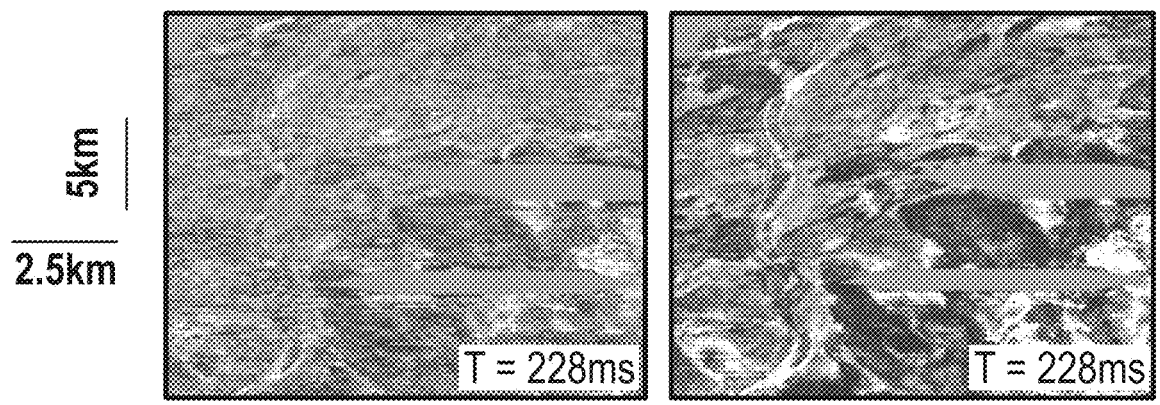
FIGS. 8A-8B shows time slice (FIG. 8A) and PSDM section comparison before (left) and after (right) CSI reconstruction (FIG. 8B).
Figure 8B:
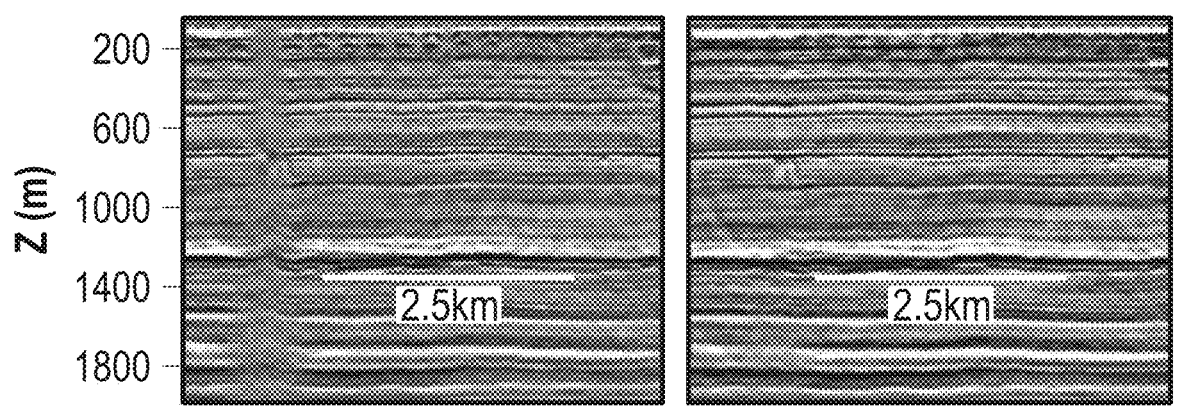

In the current CSI acquisition design, a perturbation for shot interval along inline direction and cable spacing along crossline direction were predetermined following NUOS. The CSI-related processing technology allows us to infill gaps in various data domain and reconstruct irregularly sampled data onto much fine grids. The reconstruction process has raised the data resolution, reduced acquisition gaps and improved fold coverages for all offsets. This in turn granted the seismic data higher resolution for structure imaging and reduced the amount of migration swings in shallow PSDM image, as nicely illustrated in FIGS. 8A-8B. The two gaps shown in the time slices in FIG. 8A are due to the existing production infrastructure, which was infilled by the re-processed legacy data.

Velocity Modeling

An initial Vo model was built using well data and controlling geological horizons. Isotropic Kirchhoff PSDM gathers were then produced at well locations with available checkshots and/or sonic-logs, and interactive RMO analysis was carried out to derive the initial anisotropy models (Delta and Epsilon). As all isotropic PSDM gathers were curving down, negative anisotropy values were indicated. Such negative anisotropy is abnormal (Thomsen, 1986) but was confirmed by a literature study (Asaka et al., 2016) over the area and is consistent with field observations of highly-populated fault systems which could be linked to multi-stage regional tectonic events (Amir et al., 2010).

Based on well-mistie and gather-flatness, the anisotropy models were finetuned throughout the velocity updating process. Due to operation unit business needs, parallel efforts were taken: legacy data was used to build a velocity model and the CSI data was processed at the same time.

Figure 9A:
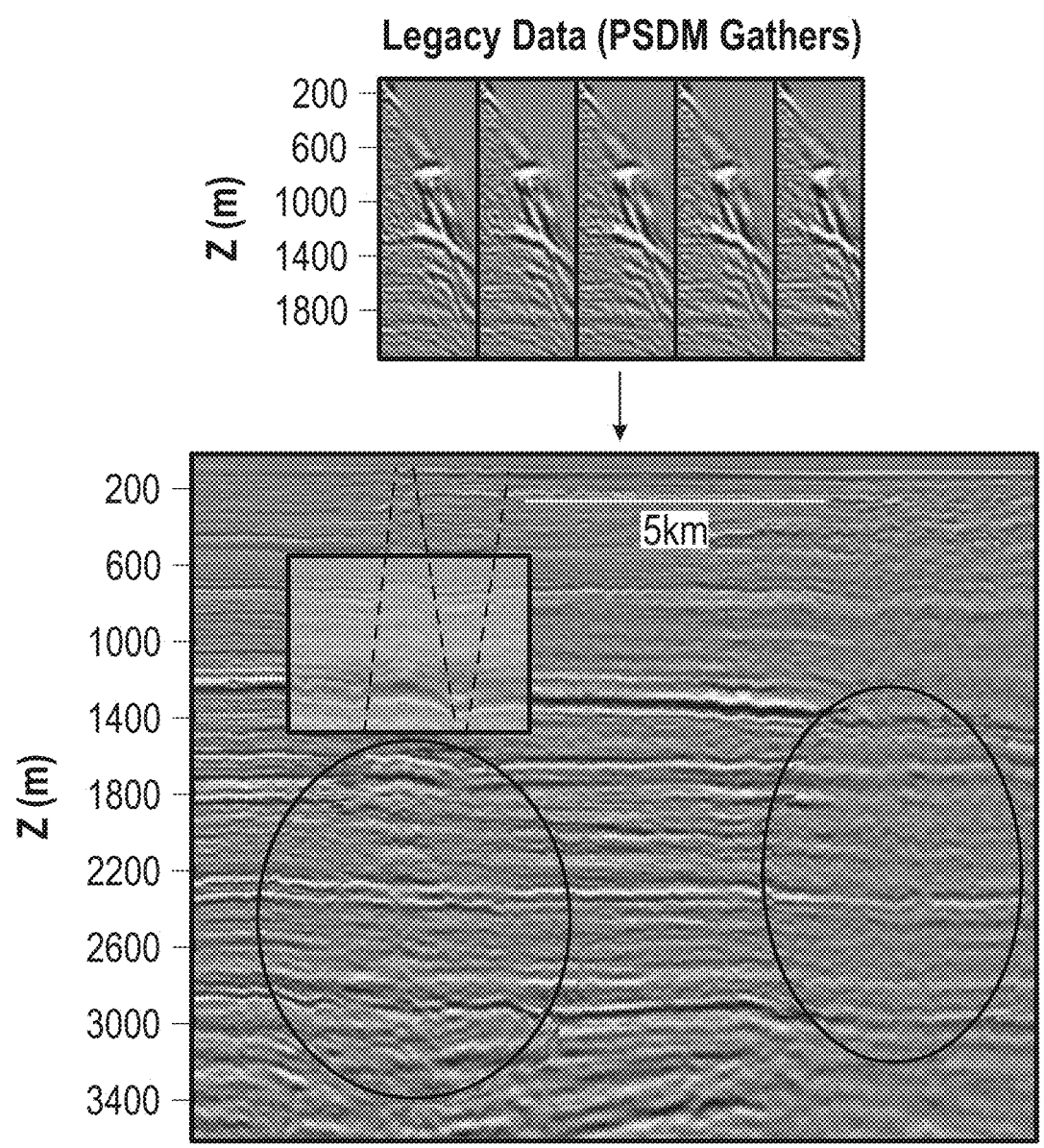
FIGS. 9A-9B show CSI PSDM image from fast-track using velocity model built using legacy data (FIG. 9A) and final CSI PSDM image using velocity model built using CSI data (FIG. 9B). Dashed line highlights fault boundaries and circles show regions of improvements.
Figure 9B:
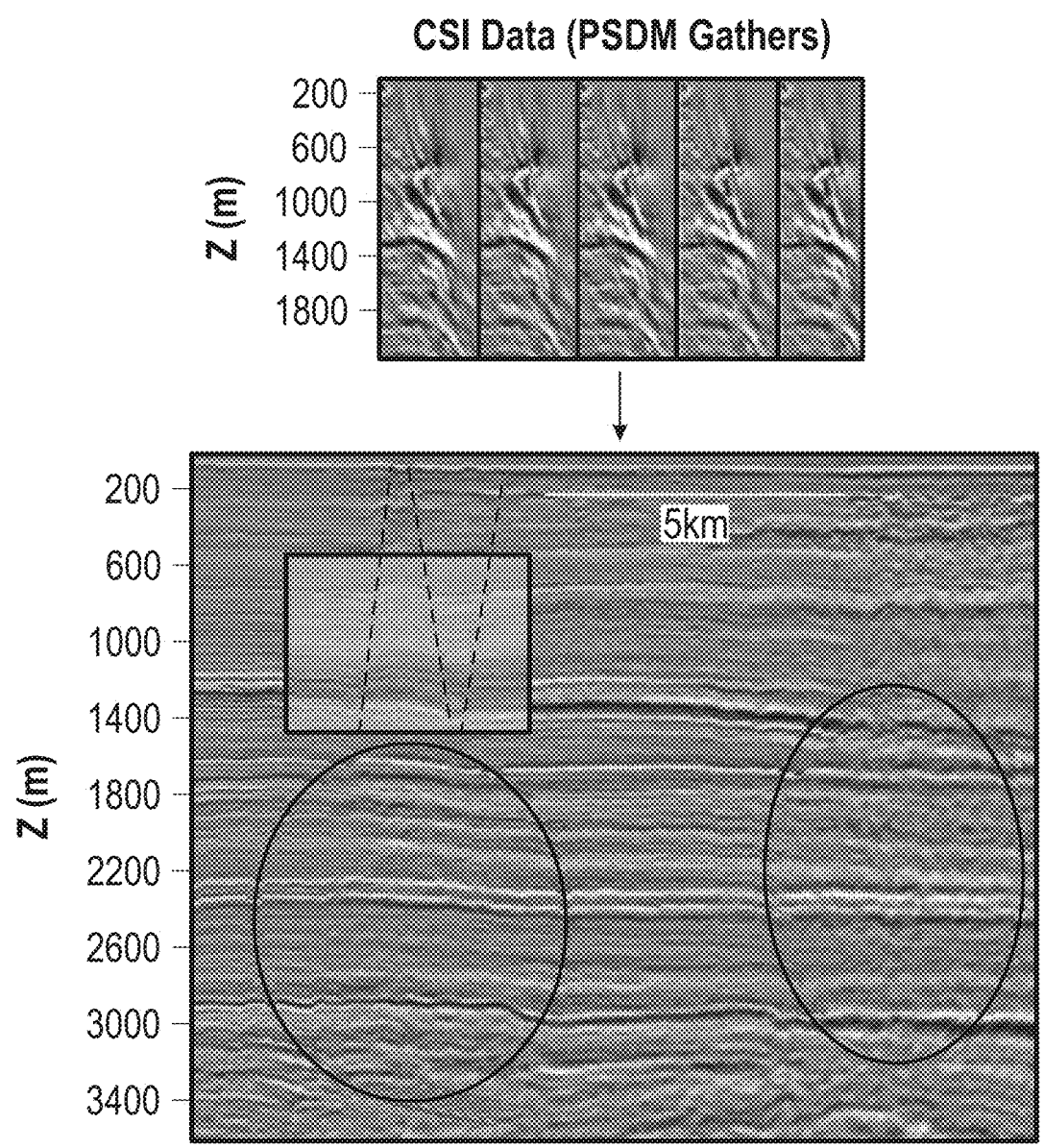

When both tasks were complete, a fast track migration volume was delivered (FIGS. 9A-9B, bottom panel). CSI data was then used to refine the velocity model for final delivery.

This workflow allowed us to directly compare migrated gather quality and resulting velocity models when using legacy data vs. CSI input. Comparing to legacy gathers, CSI gathers have broad frequency bandwidth, less residual multiples, and better S/N (FIGS. 9A-9B, top panel). This resulted in better RMO information for reflection tomography and higher velocity accuracy. The rich low frequency in the CSI data provided additional uplift for the Full Waveform Inversion workflow to finetune the shallow velocity. A comparison of inserted velocity sections in FIGS. 9A-9B (bottom panel) indicates the velocity derived from legacy data lacks lateral and vertical resolution (FIG. 9A) as compared to the CSI data (FIG. 9B). To achieve such improvement in the production phase, on top of employing CSI data for model refinement, we also introduced new model building techniques and increased model building efforts. The final PSDM image using CSI-derived velocity model is shown in FIG. 9B (bottom panel).

Results

Figure 10A:
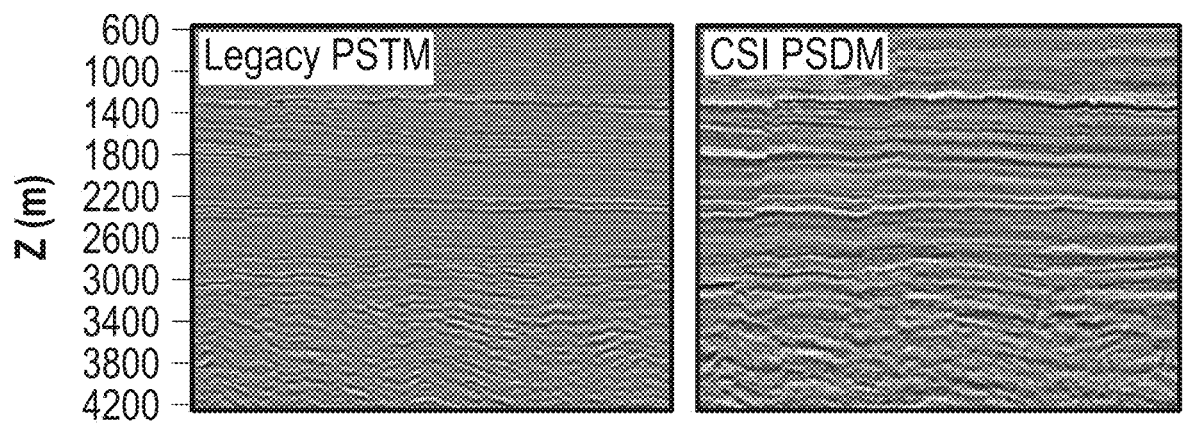
FIGS. 10A-10B show post-migration stack image comparison (FIG. 10A) and above-reservoir coherence semblance comparison (FIG. 10B) between current PSDM and legacy PSTM imaging results (converted to depth).
Figure 10B:
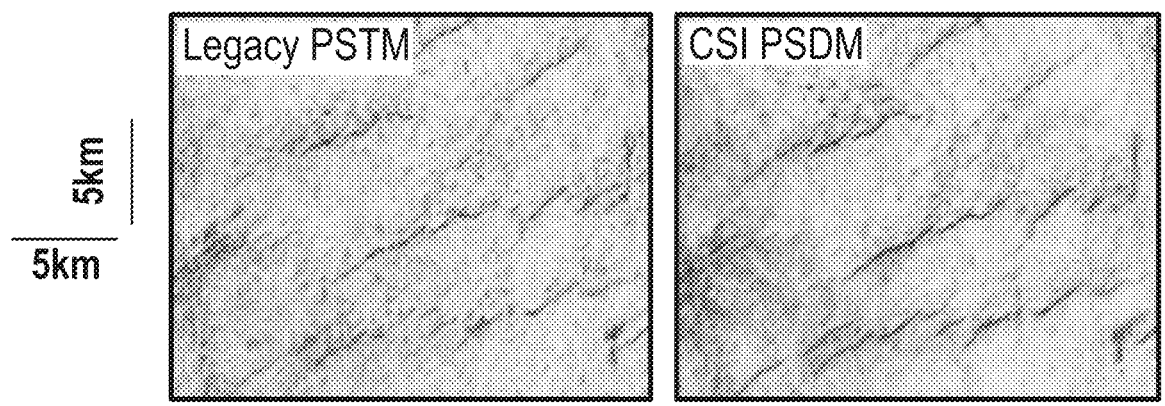

Combining the unprecedented data quality from a CSI survey and the superior demultiple and velocity modeling technologies, a Kirchhoff PSDM stack section is shown in FIG. 10A (right) in comparison against a corresponding PSTM stack section (converted to depth) generated by contractor from legacy survey. The comparison indicates the PSDM image from current CSI project has clearer reservoir structures, sharper fault planes and broader bandwidth. The coherency semblance (a measurement for fault imaging quality and overall noise level) comparison in FIG. 10B also indicates that the CSI PSDM image (right panel) has better focused fault images and lower noise level than the legacy PSTM image (left panel). A seismic-well tie QC also indicates <1% misties at the top of reservoir depth for all 30 plus wells.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A method of seismic data processing the method comprising:
    acquiring undersampled seismic data from one or more sources and one or more receivers of a seismic survey with a non-uniform sampling grid designed using non-uniform optimal sampling design, the non-uniform sampling grid including at least one of the one or more sources or the one or more receivers positioned with a non-uniform spacing;
    modeling near-angle water bottom reflection data;
    attenuating multiples from the undersampled seismic data; and
    generating a seismic image of reservoir structures.

2. The method of claim 1, wherein the seismic survey is a marine seismic survey.

3. The method of claim 2, wherein modeling the near-angle water bottom reflection data is performed using a Green's function method.

4. The method of claim 3, wherein the modeled near-angle water bottom reflection data convolved with field data to predict water column reverberation-related multiples.

5. The method of claim 1, further comprising:
    infilling gaps in the undersampled seismic data using compressive sensing acquisition and processing.

6. The method of claim 1, further comprising:
    reconstructing the undersampled seismic data onto a finer grid using compressive sensing data reconstruction.

7. The method of claim 1, further comprising:
    generating a pre-stack depth migration image.

8. A method of seismic data processing, the method comprising:
    acquiring undersampled seismic data from one or more sources and one or more receivers of a seismic survey with a non-uniform sampling grid designed using non-uniform optimal sampling design, the non-uniform sampling grid including at least one of the one or more sources or the one or more receivers positioned with a non-uniform spacing;
    modeling near-angle water bottom reflection data;
    attenuating multiples from the undersampled seismic data;
    reconstructing the undersampled seismic data onto a finer grid using compressive sensing data reconstruction; and
    generating a seismic image of reservoir structures.

9. The method of claim 8, wherein the seismic survey is a marine seismic survey.

10. The method of claim 9, wherein modeling the near-angle water bottom reflection data is performed using a Green's function method.

11. The method of claim 10, wherein the modeled near-angle water bottom reflection is convolved with field data to predict water column reverberation-related multiples.

12. The method of claim 8, further comprising:
    infilling gaps in the undersampled seismic data using compressive sensing data acquisition and processing.

13. The method of claim 8, further comprising:
    generating a pre-stack depth migration image.

14. The method of claim 1, wherein the one or more receivers are towed behind a vessel in one or more streamers.

15. The method of claim 1, wherein the one or more receivers are ocean bottom receivers.

16. The method of claim 1, wherein the one or more sources comprises blended sources where the non-uniform optimal sampling design promotes an incoherence of blending noise.

17. The method of claim 1, wherein the seismic image of reservoir structures is used to develop an offshore field.

18. The method of claim 8, wherein the one or more receivers are towed behind a vessel in one or more streamers.

19. The method of claim 8, wherein the one or more receivers are ocean bottom receivers.

20. The method of claim 8, wherein the one or more sources comprises blended sources where the non-uniform optimal sampling design promotes an incoherence of blending noise.

21. The method of claim 8, wherein the seismic image of reservoir structures is used to develop an offshore field.

* * * * *